E. N. LAKE & J. CUTHBERT.
PANEL BOARD.
APPLICATION FILED MAR. 20, 1908.
959,762.
Patented May 31, 1910.
2 SHEETS—SHEET 1.
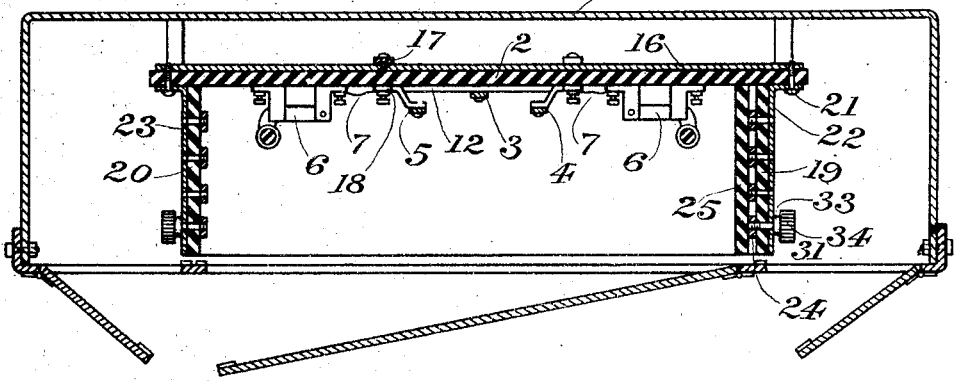
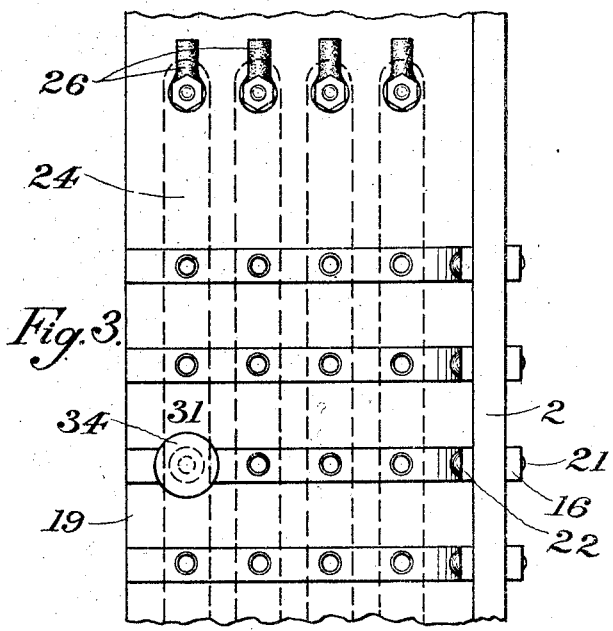
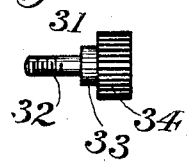
Witnesses:
H. C. Prado
David S. Hulfish
Edward N. Lake,
John Cuthbert,
Inventors.
by McNeer & Miller
Attorneys.

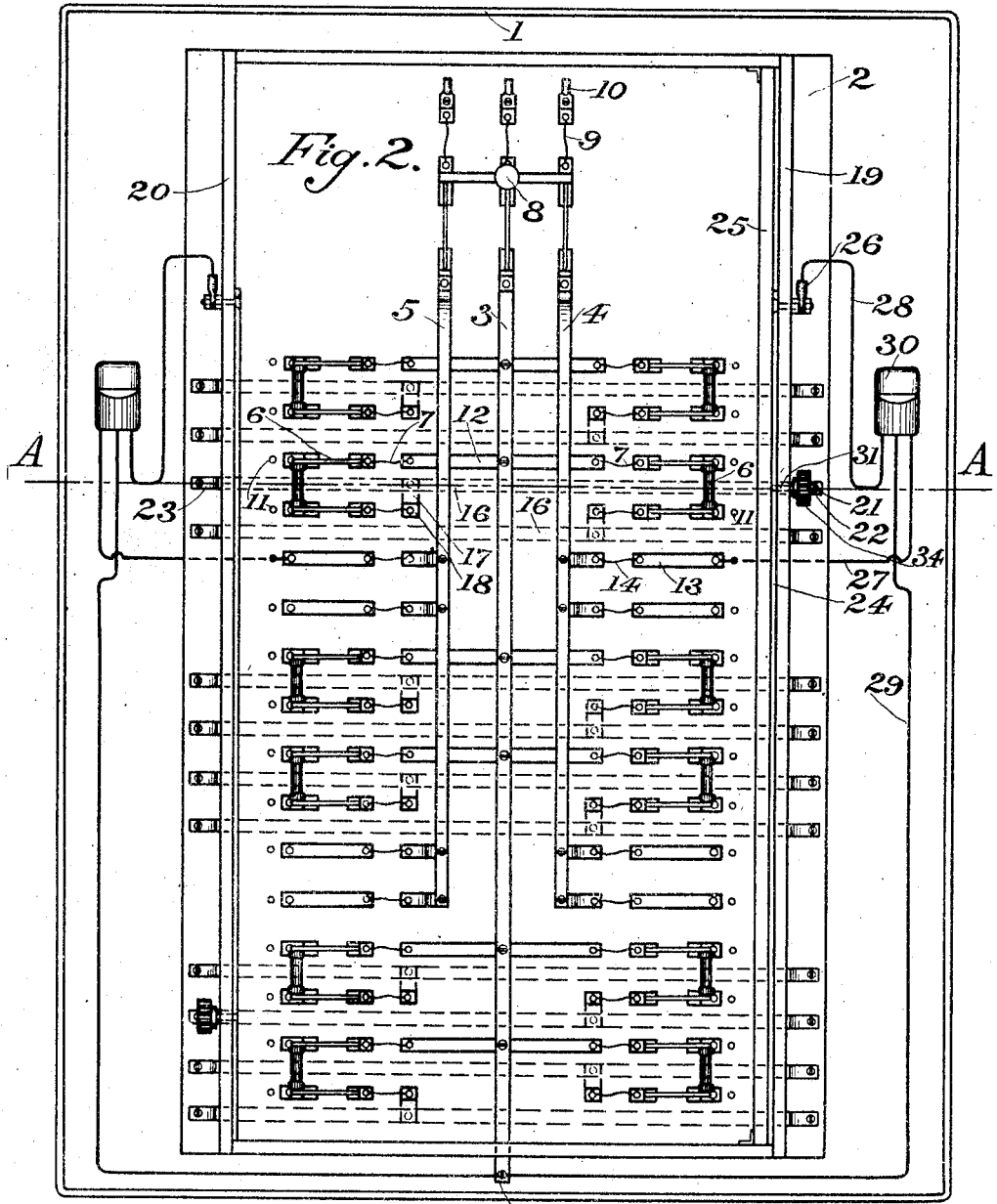

UNITED STATES PATENT OFFICE.

EDWARD N. LAKE, OF WHEATON, AND JOHN CUTHBERT, OF CHICAGO, ILLINOIS.

PANEL-BOARD.

959,762.   Specification of Letters Patent.   Patented May 31, 1910.

Application filed March 20, 1908. Serial No. 422,215.

*To all whom it may concern:*

Be it known that we, EDWARD N. LAKE and JOHN CUTHBERT, citizens of the United States of America, and residents, respectively, of Wheaton, county of Dupage, and of Chicago, county of Cook, in the State of Illinois, have invented a new and useful Improvement in Panel-Boards, of which the following is a specification.

Our invention pertains to panel boards designed for distribution of electrical power to a plurality of premises within a single building, or for distribution of electrical power under analogous conditions, and equipped with meters for measuring the consumption of power by each tenant.

Our object is to provide improved facilities for the connection of the meters and for the switching of the load circuits among the meters.

In connection with a panel board having terminals for the load circuits and terminals for the connection of meters, we provide: An interconnecting meter switchboard of the plug-switching type, whereby by a single plug any load circuit may be caused to draw its current through any desired meter, and whereby a plurality of load circuits may be switched to the same meter.

In the drawings, Figure 1 shows a section of a panel-board associated with a meter switchboard of our invention, the section being taken on the line A A of Fig. 2; Fig. 2 shows a front elevation of the same with two meters connected; Fig. 3 shows a side elevation of the meter switchboard and discloses the detail of the plug switching device whereby meters and load circuits are interconnected; Fig. 4 shows a detail of the switching plug.

The panelboard shown is mounted in a containing case 1. The slab 2 of insulating material carries bus bars 3, 4, 5, switches 6, fuses 7, a main switch 8, main fuses 9, and main terminals 10. Adjacent to the switches 6, holes 11 are drilled through the slab 2 for convenience in running the load circuit wires and meter connection wires; all switches 6 are connected through fuses 7 and auxiliary bus bars 12 to the bus bar 3. Bus bars 4 and 5 are connected to terminal bars 13 through fuses 14. Bus bar 3 is extended at 15 to offer a terminal for connection of meter pressure wires. An isolated terminal 18 is connected through one of the fuses 7 to one side of switch 6, the switch 6 thus connecting one side of a load circuit to the main bus bar 3 and the alternative side of the load circuit to the isolated terminal 18. This isolated terminal 18 we call a load circuit terminal, considering that the load circuit passes from the bus bar 3 to and through the load or power consuming devices and returning to the terminal 18 where for the purpose of applying our invention we conceive the load circuit to terminate.

Each meter is connected by a wire 27 from the series coil through a terminal bar as 13 and fuse 14 to the desired bus bar. The pressure terminal of the meter is connected to the terminal 15. The meter circuit remains adapted for connection from its free terminal to the load circuit terminal 18 of any desired load circuit to complete a circuit whereby the load will draw electrical current through the meter.

In connection with a panelboard as above described, we provide a plug-switch interconnecting device for meters and load circuit terminals, as follows: Near the edge of the slab 2 are non-conducting slabs 19—20 perpendicular to the slab 2 and these slabs form the basis for the plug switch device by which the load circuits are connected among the meters. The transverse bar 16 is connected through the screw 21 to the angle bar 22 which lies upon the outside of the slab 19 perpendicular to the slab 2; at the other end the transverse conducting bar 16 is similarly connected to the angle bar 23. Fastened upon the inner face of the slab 19 and parallel to the surface of the slab 2 are meter bus bars 24, one for each meter installed. These meter bus bars may be in part upon the slab 19 and in part upon the slab 20 if so desired, when the number of meters is so great that the bus bars required would be more than could be installed conveniently upon one of the slabs. An additional insulating slab 25 may be placed over the meter bus bars to protect them from accidental contact if so desired. Each meter bus bar has a terminal 26 upon the outside surface of the slab 19 or 20. In meters of the watt-meter type, both series and bridged circuits are required, the series circuit being connected from bar 13 through wire 27 through the meter and thence through wire 28 to terminal 26 and to the meter bus bar, while the bridged circuit is connected from bar 13 through wire 27, through the meter and through wire 29 to terminal 15 upon the bus bar 3, this in connection with the fuse 14 completing the circuit for the pressure coil of the meter 30 from the bus bar 4 to bus bar 3. At each intersection of an angle bar 22 and a meter bus bar 24, the slab 19 is drilled to clear a switching plug 31. At such an intersection the angle bar 22 is drilled and the meter bus bar 24 is drilled and tapped for the connecting plug. A connection is made between an angle bar and a meter bus bar by passing the screw 32 of the plug 31 through the angle bar and screwing it into the bus bar until the shoulder 33 takes firm seat against the angle bar. A non-conducting head 34 is provided for the plug. A connection is completed between a load circuit and a meter circuit by the use of a plug 31 and such a circuit may be traced as follows: From bus bar 3 (see Fig. 2) through branch bus bar 12, fuse 7, upper blade of switch 6 to the leading in wire of the load circuit which may be attached to the upper half of switch 6, and passing thence through the adjacent hole 11 downward through the slab 2 and outward to and through the load devices on the premises of the user of the electric current, returning thence upon the other wire of the load circuit which goes into the case containing the panelboard and is brought up through the slab 2 through the hole 11 adjacent to the lower half of switch 6, the current then passing through the lower blade of switch 6 and the fuse thereof to terminal block 18, thence down through the slab 2 through the conducting screw securing the load terminal block 18 to the short lateral bar 17, through the bar 17, transverse bar 16, screw 21, (see Fig. 1) angle bar 22, switch plug 31, meter bus bar 24, terminal 26, wire 28, (see Fig. 2), series coil of meter 30, wire 27, bar 13, fuse 14 to bus bar 4.

It is evident that as many plugs 31 as may be desired may be screwed into bus bar 24 of meter 30, each plug thus connecting an additional load circuit to the series coil of that meter or to any other desired meter having a bus bar. The load circuits thus may be distributed in any combination, singly or in groups, to the meters installed, and load circuits or groups of load circuits may be changed from meter to meter as desired, the sole switching operation being the removal or the installation of a switching plug such as 31 and being accomplished without a tangle of jumper wires such as are common in installations not provided with the device of our invention.

In the mounting of our improved meter-switching device in the case 1, as shown, the slabs 19—20 approach the front elements of the case 1. The case 1 then is provided with doors so spaced that access may be had to the switches and fuses of the panel board without giving access to the meters outside of slabs 19—20, this being an advantage in preventing malicious tampering with the switch plugs 31.

In this application, for the purpose of illustration, we have shown a specific form of panelboard associated with our improved switching device. The use of our invention is not restricted to such specific types but is capable of wide application to panelboards of various types.

Having thus described our invention, what we claim as new and desire to secure by United States Letters Patent is:

1. In a panel board, a structure comprising three insulating slabs, one of which is a base slab and the other two of which are side slabs mounted perpendicularly to the face of said base slab and forming sides of an apartment containing apparatus mounted upon the central portion of said base slab; bus bars and meter terminals located upon said base slab between said slabs; conductor bars mounted upon the back of said base slab; load bars upon said side slabs; meter bars upon said side slabs, said meter bars running transversely of said load bars, and upon the opposite side of said side slabs from said load bars; load circuits extending from said bus bars on the face of said base slab out to and from the load devices, and returning to the face of said base slab and thence connected to said conductor bars mounted upon the back of said base slab and thence connected to said load bars upon said side slabs; meters; meter circuits extending from said bus bars to and through said meters and thence to said meter bars upon said side slabs; and switch plugs connecting meter bars and load bars whereby complete circuits are provided for current from bus bar to bus bar, each such complete circuit comprising one of said meter circuits in series with one or more of said load circuits, substantially as described.

2. In a panelboard, a structure comprising two insulating slabs, the first of which is a main slab and comparatively broad, and the second of which is an auxiliary slab and narrow as compared with said main slab; bus power terminals and circuit-controlling switches located upon said main slab; load-terminal bars located upon one side of said auxiliary slab; load circuits extending from a first bus power terminal and through a switch and adapted to extend thence by house wiring to and through the load elements and return, and thence extending to said load-terminal bars; meter-terminal bars located upon the other side of said auxiliary slab; meter circuits extending from a second bus power terminal and through a meter to said meter-terminal bars; and means for inter-connecting said load-terminal and said meter-terminal bars; said auxiliary slab being set in front of the plane of said main slab so as to render the face of said main slab and both sides of said auxiliary slab simultaneously accessible to the manipulator of the panelboard, substantially as described.

3. In a panelboard, a structure comprising two insulating slabs, the first of which is a main slab and comparatively broad, and the second of which is an auxiliary slab and narrow as compared with said main slab; bus power terminals and circuit-controlling switches located upon said main slab; load-terminal bars located upon one side of said auxiliary slab; load circuits extending from a first bus power terminal and through a switch and adapted to extend thence by house wiring to and through the load elements and return, and thence extending to said load-terminal bars; meter-terminal bars located upon the other side of said auxiliary slab; meter circuits extending from a second bus power terminal and through a meter to said meter-terminal bars; and means for interconnecting said load terminal and said meter-terminal bars; said main slab and said auxiliary slab being set at an angle to each other so as to render the face of said main slab and both sides of said auxiliary slab simultaneously accessible to the manipulator of the panelboard, substantially as described.

4. In a panel-board, a structure comprising two insulating slabs, the first of which is a main slab and comparatively broad, and the second of which is an auxiliary slab and narrow as compared with said main slab; bus power terminals and circuit-controlling switches located upon said main slab; load-terminal bars located upon one side of said auxiliary slab; load circuits extending from a first bus power terminal and through a switch and adapted to extend thence by house wiring to and through the load elements and return, and thence extending to said load-terminal bars; meter-terminal bars located upon the other side of said auxiliary slab; meter circuits extending from a second bus power terminal and through a meter and to said meter-terminal bars; and switch plugs passing through said auxiliary slab and interconnecting said load-terminal and said meter-terminal bars; said main slab and said auxiliary slab being set at an angle to each other so as to render the face of said main slab and both sides of said auxiliary slab simultaneously accessible to the manipulator of the panelboard, substantially as described.

5 In a switchboard, two plates of insulating material; terminal bars of two classes; the bars of one class being included between said two plates of insulating material and the bars of the second class being mounted upon the outer face of one of said insulating plates and running transversely of said first bars; said insulating plate thus included between the two classes of bars being provided with holes through the plate, one hole at each crossing of any two bars of the two classes respectively, said bars also being perforated to correspond with such holes in the insulating plate; and switch plugs adapted to pass through any outer bar and to screw into an inner bar, thereby constituting a universal switch for connecting any two bars of different classes, substantially as described.

Signed by us at Chicago, county of Cook and State of Illinois in the presence of two witnesses.

EDWARD N. LAKE.
JOHN CUTHBERT.

Witnesses:
DAVID S. HULFISH,
HARVEY L. HANSON.